Figure 1:
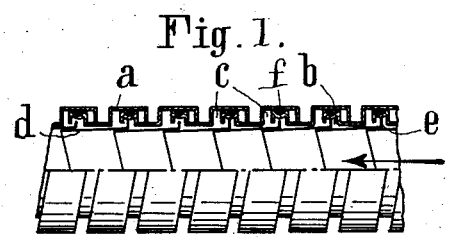

B. M. PECHSTEIN.
METALLIC FLEXIBLE HOSE PIPE.
APPLICATION FILED FEB. 3, 1910.

1,023,032.

Patented Apr. 9, 1912.

WITNESSES

INVENTOR
Bruno Max Pechstein
BY
ATTORNEYS

UNITED STATES PATENT OFFICE.

BRUNO MAX PECHSTEIN, OF ZWICKAU, GERMANY, ASSIGNOR TO THE FIRM OF GEBRÜDER JACOB, OF ZWICKAU, GERMANY.

METALLIC FLEXIBLE HOSE-PIPE.

1,023,032.   Specification of Letters Patent.   Patented Apr. 9, 1912.

Application filed February 3, 1910. Serial No. 541,716.

*To all whom it may concern:*

Be it known that I, BRUNO MAX PECHSTEIN, a subject of the King of Saxony, residing at Spiegelstrasse 9, Zwickau, Saxony, Germany, have invented a certain new and useful Improved Metallic Flexible Hose-Pipe, of which the following is a specification.

This invention relates to metallic flexible hose pipes.

Flexible metallic hose pipes as constructed hitherto have not been at all suitable for transporting granular material such as grain or the like, because the interior surface was broken up by a series of furrows wherein the material is caught and the passage of the material therethrough greatly retarded thereby. Especially for those industries connected with the manufacture of food products and breweries, distilleries or yeast manufactories the hose used hitherto is not at all adapted for this purpose owing to the fact that it is impossible to clean the furrows thoroughly, the result being that the residue which remains in the hose and which easily decomposes, spoils the liquids or materials which are subsequently passed through the hose.

The present invention has for its object to remedy these defects and consists in forming the hose with a smooth interior surface preferably formed by a flat spirally wound band. This lining band can either form a separate part in itself or may be in the form of an overlapping portion which is an extension of the band which forms the hose, this band and overlapping portion consisting of one piece.

The lining band is provided with a projection engaging in the grooves of the hose and is thereby kept safely in position. Further the hose is considerably strengthened by this lining band while the flexibility remains at the same time unimpaired.

This new form of hose construction is also very suitable for transporting corrosive liquids and the like. Metal hose pipes consisting of steel and the like are not adapted for this purpose being destroyed in a very short time by such substances. Hose pipes intended to be used for such purposes are usually constructed of copper bronze. But pipes made of copper bronze and intended to withstand pressure, have to be made much thicker than steel pipes owing to the fact that copper bronze is not so capable of resisting pressure as steel. The cost of production is therefore increased and consequently such pipes are frequently not employed for such purposes. The new hose however solves the difficulty since the body of the hose which has to withstand the pressure can be made of a cheap material such as steel, while the interior lining which can be weaker, is made of a material capable of withstanding the corrosive action of acids and the like. By this means the cost of production is reduced and the weight of the hose is kept comparatively low.

Reference will now be made to the accompanying drawings which show by way of example three forms of construction of a hose according to the invention, the views being partly in longitudinal section, and partly in outside elevation.

Figure 2:
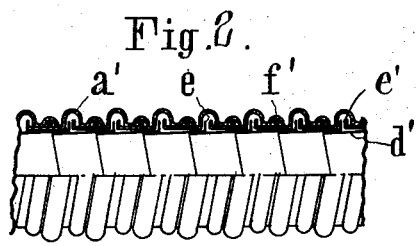
Figure 3:
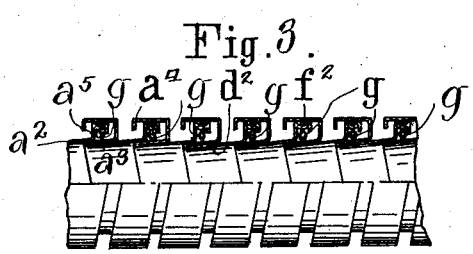

Figure 1 shows a hose with the improvement applied thereto; and, Figs. 2 and 3 illustrate modified forms of the invention.

Referring to Fig. 1 of the drawing, the hose is formed of a spirally wound corrugated band $a$ of steel or the like, the corrugations being rectangular in cross section, and between the convolutions of the band packing $f$ is arranged. The hose pipe thus formed will have on its inner face furrows or grooves $b$ and $c$, and in order to cover these furrows or grooves and give to the hose a smooth inner surface, I arrange a lining $d$. This lining is in the form of a spirally wound band of brass, celluloid or other suitable material, and in order that it may be firmly held in the hose, it is provided with projections $e$ extending into the furrows or grooves of the band $a$. The convolutions of the lining or band $d$ overlap one another and may be made fluid tight in any suitable manner. The lining $d$ is preferably placed in the hose when the latter is being made. By thus constructing the hose it has a smooth inner surface and at the same time will be reinforced without impairing its flexibility. The hose can be easily and thoroughly cleaned and offers but little resistance to the material passing through it and particularly if the material be passed through in the direction of the arrow.

The hose shown in Fig. 2 is formed of a spirally wound band $a'$ corrugated for about one half of its width and provided at the edge of its plain portion with a flange, the corrugations being curved and of unequal size and into the larger one of which the flange projects. Packing $f'$ is arranged between the corrugations of the band as shown. Within the hose a spirally wound band $d'$, similar to the band $d$ of Fig. 1, is arranged with its projections $e'$ extending into the corrugations of the band $a'$. In the hose shown in Fig. 3, the lining $d^2$ is integral with the hose, the whole being formed from a single band $a^2$ spirally wound. The band $a^2$ is first folded upon itself for a part of its width as at $a^3$, the upper member of the folded portion is then bent to the form shown at $a^4$ and the lower member which extends beyond the part $a^4$ is bent to the form shown at $a^5$. Packing $f^2$ is arranged between the parts $a^4$ and $a^5$ and a packing $g$ is arranged between the part $a^5$ and the folded portion of the band. This packing $g$ keeps the hose tight when pressure is present therein, and as the said packing rests upon the folded portion of the band, it is firmly supported and consequently possesses great resistance. Such a form of secondary packing could also be applied to the other modes of construction.

What I claim and desire to secure by Letters Patent of the United States is:—

1. A metallic hose pipe in which the internal furrows of the hose are covered by means of a spirally wound flat band, whose windings overlap each other without being joined together and are provided with projections engaging loosely in the furrows of the hose.

2. A metallic hose pipe in which the internal furrows of the hose are covered by means of a spirally wound flat band, whose windings tightly overlap each other without being joined together and have the form of an overlap formed by the middle part of the outer band, so that the covering band and the outer band consist of one piece.

3. A metallic hose having grooves on its inner face, and provided with a lining formed of a spirally wound flat band having its convolutions overlapping and in engagement with one another, whereby the grooves of the hose will be wholly covered by said lining and a straight and flush inner surface given to the hose.

In witnesses whereof I have hereunto set my hand in the presence of two witnesses.

BRUNO MAX PECHSTEIN.

Witnesses:
ROBERT HEINRICH NIER,
HAÜS LÜDEN.